(No Model.)

A. REIN.
CASTER.

No. 306,282. Patented Oct. 7, 1884.

Witnesses:

Adam Rein   Inventor
by James W. See
Attorney

UNITED STATES PATENT OFFICE.

ADAM REIN, OF HAMILTON, OHIO.

CASTER.

SPECIFICATION forming part of Letters Patent No. 306,282, dated October 7, 1884.

Application filed May 21, 1884. (No model.)

*To all whom it may concern:*

Be it known that I, ADAM REIN, of Hamilton, Butler county, Ohio, have invented certain new and useful Improvements in Furniture-Casters, of which the following is a specification.

This invention pertains to furniture-casters, and it relates particularly to the arrangement of the swivel-bearing.

The invention will be readily understood from the following description, taken in connection with the accompanying drawings, in which—

Figure 2:
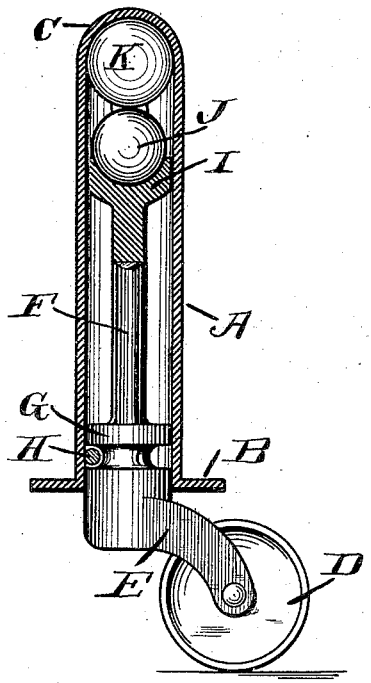
Figure 1:
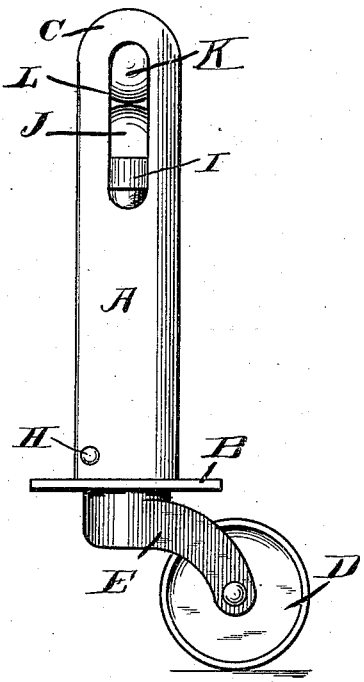

Figure 1 is a side elevation of a caster illustrating my improvement, and Fig. 2 a similar view with portions shown in vertical section.

In the drawings, a represents a socket adapted to be inserted into the leg of a piece of furniture; B, a flange at the foot of the same; C, the hemispherical roof of the socket; D, the caster-wheel; E, the caster-horn, fitted to receive the wheel, as usual; F, a stem projecting from the caster-horn upward into the socket; G, an enlargement at the foot of the stem, forming the lower bearing, properly fitting the socket, so as to secure reasonable steadiness while permitting free rotation; H, a retaining-pin across the socket engaging a circumferential groove in the enlargement G; I, an enlargement at the top of the stem, forming a top bearing for the stem within the socket, and having its upper face formed into a concave depression; J, a sphere or ball, of metal or agate or other hard material, seated freely in the depression in the top of the stem; K, a second similar ball located above ball J, and in contact with it and seating upward against the roof of the socket; and L, side openings of the socket through which the contacting portions of the balls can be viewed.

The contacting between the balls is practically a point. The friction of swiveling will be trifling, and the balls are at liberty to revolve in every direction and alter their points of contact.

The socket, instead of being inserted into the leg of a piece of furniture, may be provided with flanges or other means for being secured exteriorly against the side of a leg or other portions of the furniture.

I claim as my invention—

In a furniture-caster, a vertical socket, a sphere impinging against the roof thereof, a caster-wheel, a caster-horn, a stem projecting from the horn upward into the socket and bearing therein, a depression in the top of said stem, and a sphere seated in said depression and bearing against the first-mentioned sphere, combined substantially as and for the purpose set forth.

ADAM REIN.

Witnesses:
J. W. SEE,
W. A. SEWARD.